E. A. JOHNSTON.
HARROW ANGLING DEVICE.
APPLICATION FILED DEC. 26, 1918.
1,433,013.
Patented Oct. 24, 1922.
2 SHEETS—SHEET 2.
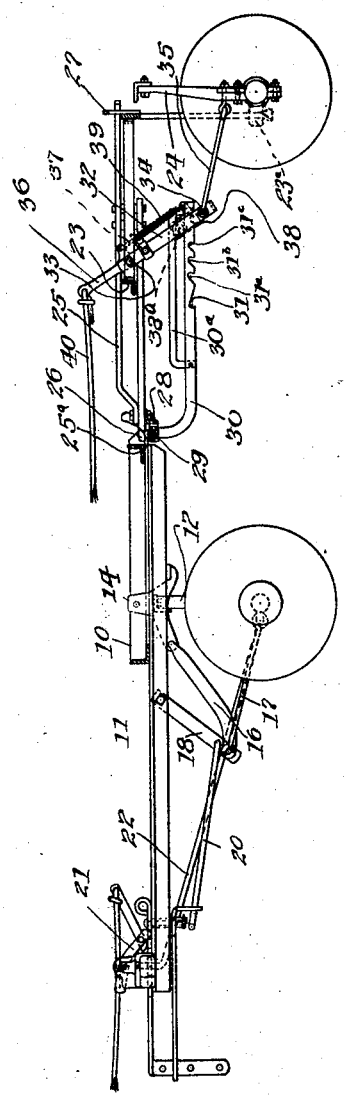
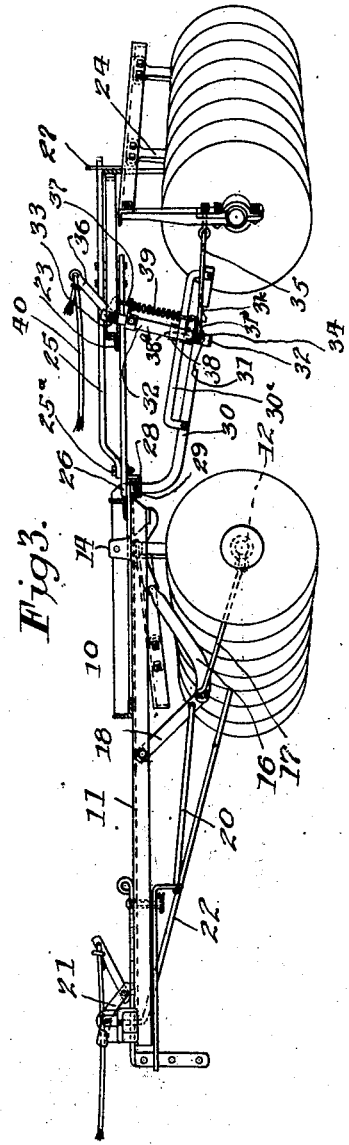
Inventor
Edward A. Johnston,
by Chas. E. Lord
Atty Patented Oct. 24, 1922.

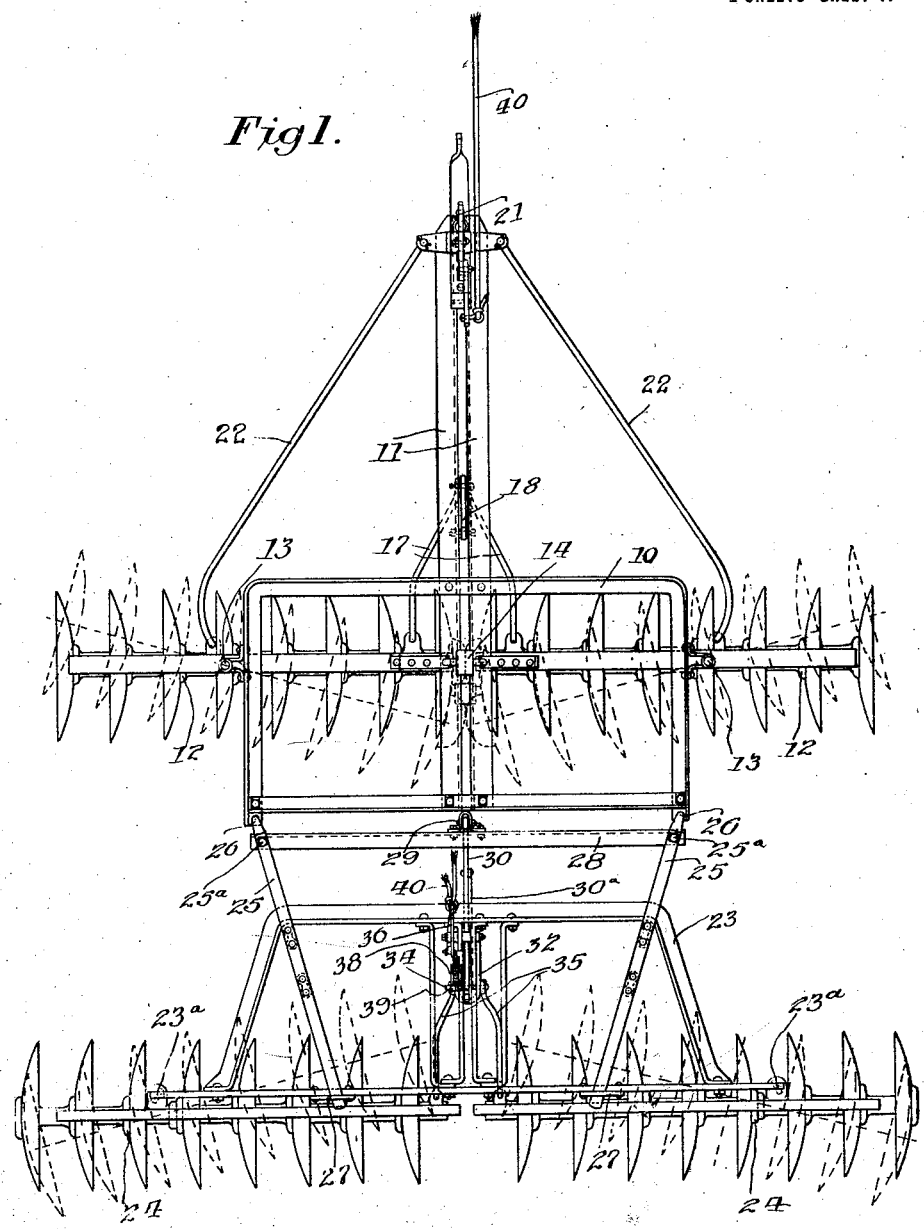

1,433,013

UNITED STATES PATENT OFFICE.

EDWARD A. JOHNSTON, OF CHICAGO, ILLINOIS, ASSIGNOR TO INTERNATIONAL HARVESTER COMPANY, A CORPORATION OF NEW JERSEY.

HARROW-ANGLING DEVICE.

Application filed December 26, 1918. Serial No. 268,369.

*To all whom it may concern:*

Be it known that I, EDWARD A. JOHNSTON, a citizen of the United States, residing at Chicago, in the county of Cook and State of Illinois, have invented certain new and useful Improvements in Harrow-Angling Devices, of which the following is a full, clear, and exact specification.

This invention relates to double disk harrows and especially to means for angling and straightening the rear sections.

An object of this invention is to provide a double disk harrow having front and rear sections and telescopic connections therebetween with means so associated with the connecting means as to allow the gangs of the rear harrow to be straightened in backing the harrow and to be angled on a forward pull.

Another object is to provide an angling means for the gangs of the rear harrow which gives as direct a pull as possible between the point of attachment to the draft members and the inner ends of the gangs.

Another object is to provide a telescoping angling connection for the gangs which is entirely below the frame of the rear section.

These and other objects are accomplished by my invention which consists among other things in a double disk harrow having front and rear sections each having disk gangs, telescopic draft members between said sections, a transverse member fastened to said members and means beneath said members connecting said transverse member with the gangs of the rear section.

Reference is now made to the drawings in which Figure 1 is a plan view of the harrow including my invention;

Fig. 2 is a longitudinal vertical section on a line at the left of the center of Fig. 1 showing the gangs straight; and Fig. 3 is the same but with the gangs angled.

The harrow is made up of two sections, a front section and a rear section. The front section has a frame 10 including tongue angles 11. Two disk gangs 12 are pivotally mounted on the frame at 13 which is so placed that more of the disks are inside this point than outside. The inside end of each front gang is secured to a guide block 14 which slides on angles 11 of the front frame. The guide block and inner end bearings are connected by rods 16 and 17 to a lever 18 which is pivotally mounted on the tongue angles. This lever is connected by rod 20 to any suitable means 21 for angling the front gangs. Brace rods 22 extend from the forward end of the tongue angles 11 to the pivot bearings of the forward gangs.

The rear section is made up of a frame 23 having disk gangs 24 pivotally connected to the rear frame at $23^a$. The rear frame is connected to the front frame by means of draft members 25 which are hingedly connected to the front at 26 and which telescope through the loops 27 of the rear frame. Each draft member 25 is made up of two bars one above and one below the rear frame, bolted together at $25^a$. These bolts also carry the two ends of the equalizing bar 28 which has pivotally mounted at 29 the forward end of the angling rod 30 which has a loop member $30^a$ and a series of notches $31^a$, $31^b$, and $31^c$ for pulling, and a notch 31 for pushing, the purpose of which will presently be explained.

A U-shaped link 32 passes around the angling rod and is pivotally mounted at the upper end on the frame by means of a bolt 33. Near the lower end of the U-shaped member 32 is a pin 34 carrying the forward ends of the links 35 which are attached to the inner ends of the rear gangs. This pin also engages the notches of the angling rod. A bell crank 36 is pivotally mounted on the bolt 33, the shorter arm of the bell crank being connected by a link 37 to a block 38 which has a pin $38^a$ slidable in the slot formed by the rod 30 and loop members $30^a$. This block is normally held down by the spring 39 so as to keep the pin 34 in engagement with the notches of the angling rod. A rope 40 is attached to the bell crank 36 and leads to the driver's seat and allows the driver to raise the angling rod 30 at will, thereby disconnecting it from the rods 35 and permitting the rear gangs to swing free.

In the operation of backing, the front and rear sections will close up due to the telescoping action of the draft members 25 and the angling rod 30, the notches $31^a$, $31^b$, and $31^c$ having a ratchet action. When the notch 31 strikes the pin 34 it positively forces the rod 35 and gangs 24 back until the straightened position is reached. The harrow can now be backed indefinitely as the rear harrow will remain straight and the push is so distributed through the frame of the rear section that there is no tendency of the two sections to swing into each other and lock as is the case in nearly all double harrows.

If we now pull ahead with the harrow sections telescoped, the front section will pull away from the rear section and the angling rod 30 will slide through the member 32 causing the pin 34 to slide from the notch 31 to the notch 31ª and any further pull will cause the rods 35 and the inner end of the gangs to be pulled forward thereby angling the rear gangs. By manipulating the rope 40 the pin 34 can be placed in any of the notches 31ª, 31ᵇ, or 31ᶜ, or if it is desired to pull forward with the rear gangs straight, the pin is disengaged entirely from the notches as shown in Fig. 2. Fig. 3 shows both harrow sections in full angling positions.

While I have in the above specification shown and described but a single embodiment of my invention, it is to be understood that it is capable of modification. Changes, therefore, in the construction and arrangement of parts may be made without departing from the spirit and scope of the invention as expressed in the appended claims.

I claim—

1. In a harrow unit, a frame, disk gangs thereon, draft members connected to said frame, means cooperating with said draft members for automatically controlling the angle of the gangs, said means including a cross member connecting said draft members, a pendant link on the frame connected to the gangs, and a rod hinged to said cross member and supported on said link below the frame for operatively connecting the disk gangs and the cross member.

2. In a double disk harrow, front and rear sections, connecting means between said sections permitting them to approach each other, the rear section having a frame, disk gangs hingedly mounted thereon, a rod suspended below the frame and having one end supported on said connecting means, and means for connecting said rod and said disk gangs when the plow is backed whereby the gangs may be straightened on backing.

3. In a double disk harrow, front and rear sections, connecting means between said sections permitting them to approach each other, the rear section having a frame, disk gangs hingedly mounted thereon, a rod suspended below the frame and movable with said connecting means, and means between said rod and said disk gangs whereby the gangs may be straightened on backing and angled by a forward pull.

4. In a double disk harrow, front and rear sections, connecting means between said sections permitting them to approach each other, the rear section having a frame, disk gangs hingedly mounted thereon, a rod suspended below the frame and movable with said connecting means, oppositely acting connecting means between said rod and said disk gangs whereby the gangs may be straightened on backing and angled by forward pull, and control means for releasing the angling connection.

5. In a harrow, front and rear harrow units, disk gangs on said units, telescopic means for connecting said units, an equalizing bar carried by said telescopic means, and a rod hinged on said equalizing bar and suspended below the frame and connecting said bar and the rear disk gangs including means for causing them to take and hold an angled position.

6. In a harrow, front and rear harrow units, disk gangs on said units, telescopic means for connecting said units, an equalizing bar carried by said telescoping means, a rod hinged on said equalizing bar and suspended below the frame and connecting said bar and the rear disk gangs including means for causing them to take and hold an angled position, and means for releasing the gangs from said angled position when the harrow is moving forward.

7. A disk harrow attachment for implements comprising a frame, disk gangs carried thereby, telescopic members on said frame for connecting to an implement a bar carried by said telescopic members, connections between said bar and said gangs including a pivotally suspended ratchet extending below the frame and engaging the gangs so that the movement of the bar causes the gangs to angle, and means operable from a point outside the harrow for disengaging said rod from said gangs.

8. In a double harrow, front and rear frames, gangs thereon, sliding draft members connecting said sections, an equalizing bar connecting said members, a telescopic link connected to the equalizing bar near its center and having a plurality of teeth which ratchet as the front and rear frames approach each other, and a pin connected to the inner ends of the rear gangs engageable with said ratchet teeth.

9. In a double harrow, front and rear frames, gangs thereon, sliding draft members connecting said sections, an equalizing bar connecting said members near the forward ends, a telescopic link connected to the equalizing bar near its center and having a plurality of teeth which ratchet as the front and rear frames approach each other, and a pin connected to the inner ends of the rear gangs engageable with said ratchet teeth.

10. In a double harrow, front and rear frames, gangs thereon, sliding draft members connecting said sections, an equalizing bar connecting said members, a telescopic link connected to the equalizing bar near its center and having a plurality of teeth which ratchet as the front and rear frames approach each other, a pin connected to the inner ends of the rear gangs engageable with said ratchet teeth, and means for releasing the pin from the ratchet teeth.

11. In a double harrow, front and rear frames, disk gangs thereon, telescopic means for joining said frames, a pin connected to the inner ends of said rear gangs, a sliding link connected to said telescopic means having ratchet teeth, and a stop notch so arranged that as the harrow is backed the pin will pass over the ratchet teeth and engage the stop notch, thereby causing the rear gangs to straighten.

12. In a double harrow, front and rear frames, disk gangs thereon, telescopic means for joining said frames, a pin connected to the inner ends of said rear gangs, a sliding link connected to said telescopic means having ratchet teeth, and a stop notch so arranged that as the harrow is backed the pin will pass over the ratchet teeth and engage the stop notch thereby causing the rear gangs to straighten, and whereby the pin will engage one of the ratchet teeth when the harrow is next advanuced thereby angling the rear gangs.

13. In a double harrow, front and rear frames, disk gangs thereon, telescopic means for joining said frames, a pin connected to the inner ends of said rear gangs, a sliding link connected to said telescopic means having ratchet teeth, a stop notch so arranged that as the harrow is backed the pin will pass over the ratchet teeth and engage the stop notch thereby causing the rear gangs to straighten, and means for disengaging said pin and sliding link.

14. In a double harrow, front and rear frames, disk gangs thereon, telescopic means for joining said frames, a pin connected to the inner ends of said rear gangs, a sliding link connected to said telescopic means having ratchet teeth, a stop notch so arranged that as the harrow is backed the pin will pass over the ratchet teeth and engage the stop notch thereby causing the rear gangs to straighten, and whereby the pin will engage one of the ratchet teeth when the harrow is next advanced thereby angling the rear gangs, and means for disengaging said pin and sliding link.

In testimony whereof I affix my signature.

EDWARD A. JOHNSTON.